United States Patent [19]

Streitel et al.

[11] Patent Number: 4,975,220

[45] Date of Patent: Dec. 4, 1990

[54] POLYAMIDE-POLYESTER FLUORESCENT PIGMENTS

[75] Inventors: Steven G. Streitel, Brecksville; George F. Rueter, Fairview Park, both of Ohio

[73] Assignee: Nalco Chemical Company, Naperville, Ill.

[21] Appl. No.: 433,808

[22] Filed: Nov. 9, 1989

[51] Int. Cl.$^5$ .............................................. C09K 11/02
[52] U.S. Cl. .............................. 252/301.35; 524/600; 524/602; 524/606
[58] Field of Search .................. 252/301.35; 524/600, 524/602, 606

[56] References Cited

U.S. PATENT DOCUMENTS

| | | |
|---|---|---|
| 2,938,873 | 5/1960 | Kazenas . |
| 3,198,741 | 8/1965 | Kazenas . |
| 3,412,036 | 11/1968 | McIntosh . |
| 3,812,054 | 5/1974 | Noetzel et al. . |
| 3,915,884 | 10/1975 | Kazenas . |
| 3,922,232 | 11/1975 | Schein . |

*Primary Examiner*—Olik Chaudhuri
*Assistant Examiner*—Jerry D. Johnson
*Attorney, Agent, or Firm*—John G. Premo; Donald G. Epple

[57] ABSTRACT

The invention provides improved fluorescent pigment compositions comprising a fluorescent dye combined in a polyamide-polyester thermoplastic resin. The resins are prepared from aromatic polycarboxlic acids and lower aliphatic amino alcohols.

13 Claims, No Drawings

POLYAMIDE-POLYESTER FLUORESCENT PIGMENTS

BACKGROUND OF THE INVENTION AND PRIOR ART

The present invention relates to fluorescent compositions including a fluorescent dye and a resin carrier, and, more particularly, to novel fluorescent compositions including an organic fluorescent dye and a polyamide-polyester resin which are useful as colorants or pigments. The compositions of the present invention exhibit improved lightfastness.

U.S. Pat. Nos. 2,938,873; 3,198,741; 3,412,036; 3,812,054; 3,922,232; and 3,915,884 disclose various fluorescent compositions made from thermoplastic resinous materials which incorporate dyes for use as coating compositions and pigments. It would be an advance in the art to have organic fluorescent compositions which resist fading of color due to exposure to light (lightfastness). The preferred organic fluorescent compositions of the present invention have improved lightfastness.

SUMMARY OF THE INVENTION

In accordance with the invention, there is provided a fluorescent pigment composition comprising a fluorescent dye[1] and a polyamide-polyester thermoplastic resin formed by the condensation reaction of a polycarboxylic acid from the group consisting of isophthalic acid, terephthalic acid, 2,6-naphthalene dicarboxylic acid and trimesic acid and mixtures thereof and at least one aliphatic primary amino alcohol which contains from 2 to 4 carbon atoms.

[1] This term includes single or multiple dyes.

In a preferred embodiment the condensation reaction of the polycarboxylic acid with the primary amino alcohol is conducted in the presence of from 0.1 to 1 mol of a polyhydric alcohol.

The thermoplastic fluorescent dye containing resins contain at least one free carboxylic acid group. Preferably the resins contain from 2 to 5 carboxylic acid groups.

THE DICARBOXYLIC ACIDS

As indicated above, the starting dicarboxylic acids or their esters or acid chlorides may be selected from such acids as isophthalic acid, terephthalic acid, 2,6-naphthalene dicarboxylic acid, trimesic acid and mixtures thereof. Of these acids isophthalic acid is preferred.

In the preparation of the polyamide-polyester resins in accordance with the invention, a stoichiometric excess of the acid component is used in the condensation reaction. About 1.0 to about 1.5 moles of COOH functional groups are reacted per each mol of $NH_2$ and/or OH functional groups, and, more preferably, 1.0 to 1.25 moles of COOH functional groups are reacted per mol of $NH_2$ and/or OH functional groups.

THE PRIMARY AMINO ALCOHOLS

These alcohols contain from 2 to 4 atoms, are aliphatic and have a fair degree of solubility in water. Illustrative of such amino alcohols is propanolamine, isopropanolamine, ethanolamine, butanolamine and isobutanolamine. Isopropanolamine and ethanolamine are preferred.

THE POLYHYDRIC ALCOHOLS

These alcohols, in a preferred embodiment of the invention, are dihydric alcohols and are either cycloaliphatic or aliphatic. They preferably contain not more than 12 carbon atoms. Illustrative of these alcohols are ethylene glycol, propylene glycol, glycerin, pentaerythritol, cyclohexanedimethanol, 2,2,4-trimethyl-1,3-pentanediol, trimethylolpropane. Of the above cyclohexanedimethanol and ethylene glycol are preferred.

The amount of polyhydric alcohol present in the reaction mixture ranges from about 0.1 to about 1 moles. In a preferred embodiment there is incorporated in to the polymer mixture prior to polymerization from about 0.1 to about 0.5 moles.

THE FLUORESCENT DYES

The fluorescent dyes employed in the compositions include fluorescent organics which are brilliantly fluorescent when in solution. These daylight fluorescent-type dyes are well known in the art and belong to the dye families known as rhodamines, fluoresceins, coumarins, naphthalimides, benzoxanthenes and acridines. Typical dyes include Basic Red 1, Basic Violet 10, Basic Violet 11, Basic Violet 16, Basic Yellow 40, Solvent Yellow 44, Solvent Yellow 131 and Solvent Yellow 135. The fluorescent dyes comprise from about 0.1 to about 15% of the total weight of the pigment.

The pigment is usually formed by incorporating the fluorescent dye in the condensation resin during its formation and thereafter grinding the cooled resin to the proper particle size. This particle size may range from about 0.1 to about 200 microns. Alternatively, the fluorescent dye can be added to the resin in a separate step after the resin is formed. The resin has been found to be friable and easily ground. This grinding is done in a conventional manner.

OPTIONAL INGREDIENTS

In addition to the foregoing components, the fluorescent compositions of the present invention may be modified by inclusion of other ingredients which may react with the acid, amine and/or alcohol components. Typically, modifiers are included to increase the molecular weight by chain extension, alter the softening or melting point, provide enhanced compatibility, provide functional groups of special affinity for particular fluorescent dyes, impart thermal stability to fluorescent dyes or otherwise complement or enhance the suitability of the resin carrier composition for a particular application. Preferred modifiers include bi- and monofunctional acids, monofunctional amines, monofunctional alcohols, epoxies, metal oxides, metal carbonates and metal acetates. Examples of such modifiers include the following compounds.

Illustrative bifunctional acids include p-aminobenzoic acid, p-hydroxybenzoic acid, 2-chloro-4-hydroxybenzoic acid and salicylic acid.

Illustrative monofunctional acids include stearic acid, lauric acid, pelargonic acid, palmitic acid, and cyclohexanecarboxylic acid.

Illustrative monofunctional amines include n-nonylamine, isononylamine, stearylamine, cyclohexylamine and benzylamine.

Illustrative monofunctional alcohols include stearyl alcohol, cetyl alcohol, n-nonyl alcohol, benzyl alcohol, monofunctional aliphatic alcohols have a weight-average molecular weight in the range of from 400 to 700, n-decyl alcohol, tridecyl alcohol, cyclohexanol, 2-ethylhexanol and cyclododecanol.

Illustrative epoxies include bispenol A epoxies and aliphatic epoxies.

Illustrative metal oxides, metal carbonates and metal acetates include zinc oxide, zinc carbonate, antimony triacetate, antimony pentoxide, antimony trioxide, calcium oxide, calcium carbonate, calcium hydroxide, magnesium oxide and magnesium carbonate.

The amount of modifier used should not adversely affect the basic novel properties of the fluorescent compositions. Usually, the amount of the reactive modifier will range from about 0.1 to about 10% based on the total weight of the composition.

Conventional additives such as opacifiers, antioxidants and processing aids may also be added to the fluorescent pigments. These materials may be added prior to, during, or after the condensation reaction is completed. In addition, the reaction can be catalyzed by use of catalysts such as are described in U.S. Pat. No. 3,922,232 which is incorporated herein by reference.

MOLECULAR WEIGHT AND GENERAL METHOD OF PREPARING THE POLYMERS

The composition of the present invention are prepared by condensation polymerization reactions illustrated by the following examples. The compositions are prepared by heating a mixture of the reactants to effect polymerization thereof. Polymerization is typically completed with heating to a maximum temperature of from about 230° to about 270° C. The polymerized condensate is then cooled to about 220° C. and the fluorescent dye is added with stirring. The resins have a weight average molecular weight in the range of from about 500 to about 10,000.

DETAILED DESCRIPTION OF THE INVENTION

Example 1

To a heated resin flask, equipped with a mechanical stirrer, is added 46.3 grams of cyclohexanedimethanol (90%), 86.8 grams of monoisopropanolamine and 246.2 grams of isophthalic acid. Mixture is stirred and heated to 240° C., cooled to 22020 C. at which time fluorescent dyes are added to the composition. Composition is stirred at 220° C. for 5 minutes and the finished composition is cooled rapidly to room temperature. At this time the material is ground to a fine powder and tested.

Example 2

To a heated resin flask, equipped with a mechanical stirrer, is added 48.6 grams of cyclohexanedimethanol (90%), 74.13 grams of monoethanolamine and 277.4 grams of isophthalic acId. Mixture Is stirred and heated to 240° C., cooled to 220° C. at which time fluorescent dyes are added to the composition. Composition is stirred at 220° C. for 5 minutes and the finished composition is cooled rapidly to room temperature. At this time the material is ground to a fine powder and tested.

ADVANTAGES OF INVENTION in addition to improved lightfastness, there are listed below additional advantages achieved by using this invention:

(1) More environmentally safe raw materials
(2) Useful in a wide range of applications
(3) Less effluent from reactor
(4) Readily available raw materials

Having thus described my invention it is claimed as follows:

1. A fluorescent pigment composition comprising a fluorescent dye and a polyamide-polyester thermoplastic resin formed by the condensation reaction of a polycarboxylic acid from the group consisting of isophthalic acid, terephthalic acid, 2,6-naphthalene dicarboxylic acid and trimesic acid and mixtures thereof and at least one aliphatic primary amino alcohol which contains from 2 to 4 carbon atoms, which resin has a weight average molecular weight in the range of from about 500 to about 10,000 and contains at least 1 free carboxylic acid group.

2. A pigment composition according to claim 1, wherein the resin is characterized as containing from 2-5 free carboxylic acid groups.

3. A pigment composition according to claim 1, where the aliphatic amino alcohol is isopropanol amine.

4. A pigment composition according to claim 1, where the aliphatic amino alcohol is ethanol amine.

5. A pigment composition according to claim 1, wherein said pigment includes from about 0.1 to about 15% by weight of a fluorescent dye based on the total weight of the pigment.

6. A pigment composition according to claim 1, wherein said composition is a particulate ranging in particle size from about 0.1 to about 200 microns.

7. A fluorescent pigment composition comprising a fluorescent dye and a polyamide-polyester thermoplastic resin formed by the condensation reaction of a polycarboxylic acid from the group consisting of isophthalic acid, terephthalic acid, 2,6-naphthalene dicarboxylic acid and trimesic acid and mixtures thereof and at least one aliphatic primary amino alcohol which contains from 2 to 4 carbon atoms, and from 0.1 to 1 mol percent of a polyhydric alcohol said resin being characterized as containing at least 1 free carboxylic acid group and having a weight average molecular weight in the range of from about 500 to about 10,000.

8. A pigment composition according to claim 7, where the aliphatic amino alcohol is isopropanol amine and the polyhydric alcohol is cyclohexane dimethanol.

9. A pigment composition according to claim 7, wherein the resin is characterized as containing from 2-5 free carboxylic acid groups.

10. A pigment composition according to claim 7, where the aliphatic amino alcohol is isopropanol amine.

11. A pigment composition according to claim 7, where the aliphatic amino alcohol is ethanol amine.

12. A pigment composition according to claim 7, wherein said pigment includes from about 0.1 to about 15% by weight of a fluorescent dye based on the total weight of the pigment.

13. A pigment composition according to claim 7, wherein said composition is a particulate ranging in particle size from about 0.1 to about 200 microns.

* * * * *